United States Patent
Xu et al.

(10) Patent No.: US 12,113,666 B1
(45) Date of Patent: Oct. 8, 2024

(54) METHOD AND APPARATUS TO COORDINATE MULTIPLE CONTROLLER DEVICES TO SERVE CLIENT REQUESTS

(71) Applicant: Zenlayer Innovation LLC, Wilmington, DE (US)

(72) Inventors: Jun Xu, Cupertino, CA (US); Hao Wang, Diamond Bar, CA (US); Seagle Yang, Rosemead, CA (US)

(73) Assignee: Zenlayer Innovation LLC, Wilmington, DE (US)

( * ) Notice: Subject to any disclaimer, the term of this patent is extended or adjusted under 35 U.S.C. 154(b) by 0 days.

(21) Appl. No.: 17/720,640

(22) Filed: Apr. 14, 2022

(51) Int. Cl.
| | |
|---|---|
| *H04L 41/0806* | (2022.01) |
| *H04L 9/00* | (2022.01) |
| *H04L 9/08* | (2006.01) |
| *H04L 41/0893* | (2022.01) |

(52) U.S. Cl.
CPC ........ *H04L 41/0806* (2013.01); *H04L 9/0825* (2013.01); *H04L 9/50* (2022.05); *H04L 41/0893* (2013.01); *H04L 2209/463* (2013.01)

(58) Field of Classification Search
None
See application file for complete search history.

(56) References Cited

U.S. PATENT DOCUMENTS

| | | | |
|---|---|---|---|
| 9,407,566 B2 | 8/2016 | Koponen et al. | |
| 10,749,677 B2 | 8/2020 | Agrawal et al. | |
| 2013/0212148 A1* | 8/2013 | Koponen | H04L 45/66 709/201 |
| 2019/0058709 A1 | 2/2019 | Kempf et al. | |
| 2019/0196981 A1* | 6/2019 | Silvert | G06F 21/6218 |
| 2019/0332955 A1* | 10/2019 | Manamohan | H04L 9/3239 |
| 2020/0028691 A1* | 1/2020 | Rao | G06F 8/658 |
| 2020/0167342 A1 | 5/2020 | Shin et al. | |
| 2021/0234674 A1* | 7/2021 | Soroker | H04L 9/50 |
| 2021/0248131 A1 | 8/2021 | Zhuang | |
| 2021/0258375 A1* | 8/2021 | Cai | H04L 63/123 |
| 2021/0406073 A1* | 12/2021 | Pavlov | G06F 9/45558 |

FOREIGN PATENT DOCUMENTS

| | | | |
|---|---|---|---|
| CN | 111931245 A | * 11/2020 | |
| CN | 113852470 A | * 12/2021 | |
| CN | 112152974 B | * 2/2022 | ........... H04L 63/126 |
| CN | 114218169 A | * 3/2022 | |
| WO | WO-2021036702 A1 | * 3/2021 | ............. G06Q 40/04 |

* cited by examiner

*Primary Examiner* — Lance Leonard Barry
*Assistant Examiner* — Mohammad Yousuf A. Mian
(74) *Attorney, Agent, or Firm* — Nicholson De Vos Webster & Elliott LLP (57) ABSTRACT

Methods and systems are disclosed to serve client requests in a communication network. In one embodiment, a method may be performed by a controller device to form a first consensus with a first plurality of controller devices to determine a role for the controller device. Upon the controller device being elected as a first single lead controller for the first consensus, the controller device packs a client request with other client requests into a block, validates the packed client requests within the block with the first plurality of controller devices, and seals the block after the packed client requests are validated. The controller device then forms a second consensus with a second plurality of controller devices, the second consensus electing a second single lead controller, the second single lead controller identifying one or more resources to serve the packed client requests in the sealed block.

20 Claims, 9 Drawing Sheets

METHOD AND APPARATUS TO COORDINATE MULTIPLE CONTROLLER DEVICES TO SERVE CLIENT REQUESTS

FIELD

The present invention relates to the field of networking; and more specifically, to coordinating multiple controller devices to serve client requests in a communication network.

BACKGROUND

Cloud computing and virtual computing environments provide remote computing resources and remote data storage resources in various applications. A cloud service provider may implement multiple network controllers such as software-defined networking (SDN) controllers to serve client requests in a communication network, where each network controller serves some client requests. In such a distributed approach, accessing a network controller is often a remote access for a client, and the network controller handles the full lifecycle of the client request. Yet cloud service providers may have distributed computing resources at various locations in the communication network, and it is challenging to provide a consistent user experience for client requests when they are served by the network controllers without coordination in the communication network.

To provide a better user experience, a cloud service may provide a centralized approach. In such approach, a front-end server may be deployed to accept all client requests, and the client requests are sent to a master node, which then distributes the client requests to multiple network controllers within a cluster. The cluster may implement load balancing among the multiple network controllers to achieve better performance. The service results/acknowledgement are provided to the cluster, which then may communicate with the clients through the master node. While the user experience may be improved, such centralized approach is inflexible and introduces a single point of failure in serving client requests.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Embodiments of the invention provide methods and apparatus to coordinate multiple controller devices to serve client requests in a communication network. In one embodiment, the present system utilizes a set of controllers acting together for provisioning. In one embodiment, the set of controllers may change through the process, as new controllers join or are removed from the system. In one embodiment, a user request is passed to a first controller device, and that controller device is the only element that communicates with the client. The first controller device utilizes a consensus-based coordination with multiple controller devices to evaluate, package, and provision the request.

For example, a method may be performed by a controller device to form a first consensus with a first plurality of controller devices to determine a role for the controller device. Upon the controller device being elected as a first single lead controller among the first plurality of controller devices for the first consensus, the controller device packs a client request with other client requests into a block, validates the packed client requests within the block with the first plurality of controller devices, and seals the block after the packed client requests are validated. The controller device then forms a second consensus with a second plurality of controller devices, the second consensus electing a second single lead controller, the second single lead controller identifying one or more resources to serve the packed client requests in the sealed block. The consensus-based coordination among multiple controller devices is preferrable to the prior distributed approach where work was repeated as each network controller served client requests, and the prior centralized approach where there was a single point of failure with a front-end server and cluster of multiple controller devices.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized, and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
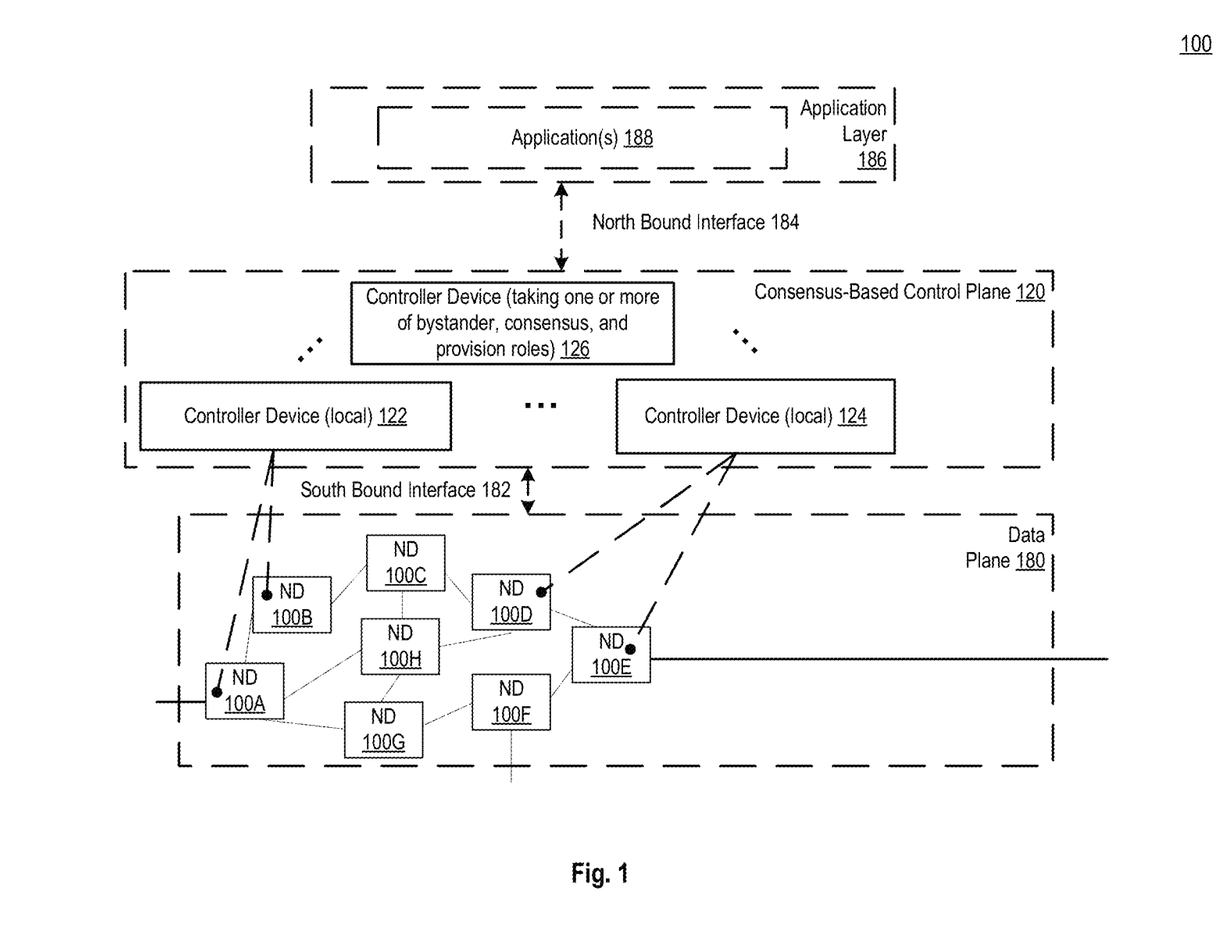
FIG. 1 shows a communication network to implement methods and apparatus to coordinate multiple controller devices to serve client requests per some embodiments.

FIG. 1 shows a communication network to implement methods and apparatuses to coordinate multiple controller devices to serve client requests per some embodiments. FIG. 1 shows communication network 100 that includes network devices (NDs) 100A to H, and their connectivity by way of lines between 100A to 100B, 100B to 100C, 100C to 100D, 100D to 100E, 100E to 100F, 100F to 100G, and 100A to 100G, as well as between 100H and each of 100A, 100C, 100D, and 100G. The network devices are also referred to as switches, forwarding elements, data plane elements, or network nodes (or simply nodes).

These NDs are physical devices, and the connectivity between these NDs can be wireless and/or wired (often referred to as links). Additional lines extending from NDs 100A, 100E, and 100F illustrate that these NDs act as ingress and egress points for the network (and thus, these NDs are sometimes referred to as edge NDs, while the other NDs may be called core NDs). Network devices in one embodiment may include 1) a special-purpose network device that uses custom application-specific integrated-circuits (ASICs) and a special-purpose operating system (OS); 2) a general-purpose network device that uses common off-the-shelf (COTS) processors and a standard OS; or 3) a hybrid network device, which includes both custom ASICs/ special-purpose OS and COTS processors/standard OS in a single ND or a single card within an ND. NDs 100A to 100H form a data plane 180, which is also referred to as the infrastructure layer, network forwarding plane, or forwarding plane.

A consensus-based control plane 120 manages client requests from NDs 100A to 100H. The consensus-based control plane 120 is also referred to as the orchestration layer, the orchestration system/module, the orchestrator, or software defined networking (SDN) orchestration system/ module when the SDN protocol is implemented. The consensus-based control plane 120 includes multiple controller devices, illustrated using controller devices 122 to 126 as examples in FIG. 1. A controller device 122 to 126 may also be referred to as an SDN control module, an SDN controller, or an OpenFlow Controller when the SDN protocol is implemented. In the SDN system or other communication networks, a controller device 122 to 126 may be also referred to as a controller, network controller, control plane node, network virtualization authority, or management control entity.

The consensus-based control plane 120 has a south bound interface 182 with data plane 180 to receive client requests from and provide responses to NDs 100A to 100H. A client request may be also referred to as a user request or a service request and it is initiated by a client of a network device to request a service/application to be provided by the communication network. The south bound interface 182 may implement the OpenFlow protocol or another networking protocol. Note that the controller devices 122 to 126 within the consensus-based control plane 120 may be distributed among multiple geographical locations, and the controller devices 122 to 126 may be deployed in multiple countries spanning one or more continents.

The consensus-based control plane 120 has a north bound interface 184 to an application layer 186, which includes application(s) 188. The application(s) 188 offer services upon requests from the consensus-based control plane 120. In one embodiment, the application layer 186 allows application developers to create new applications using defined application programming interfaces (APIs) without knowing the specific implementation of the consensus-based control plane 120. Note that in some embodiments, the application layer 186 and consensus-based control plane 120 are integrated within one system (e.g., a device may implement a controller device and a set of applications).

Of the controller devices in the consensus-based control plane 120, a controller device may directly communicate with a network device through the south bound interface 182 and receive a client request from the network device. Such controller device is referred to as the controller device local to the client request (or local controller device). As shown, the control device 122 is the local controller device for client requests from ND 100A and 100B, while the control device 124 is the local controller device for client requests from ND 100D and 100E.

Once the consensus-based controller plane 120 receives a client request from a corresponding local controller device, a consensus building process starts to serve the client request. Each controller device in the consensus-based control plane 120 may act as one or more of: a bystander controller, a consensus controller (voter or lead controller), and a provisioning controller in the consensus building process.

Figure 2:
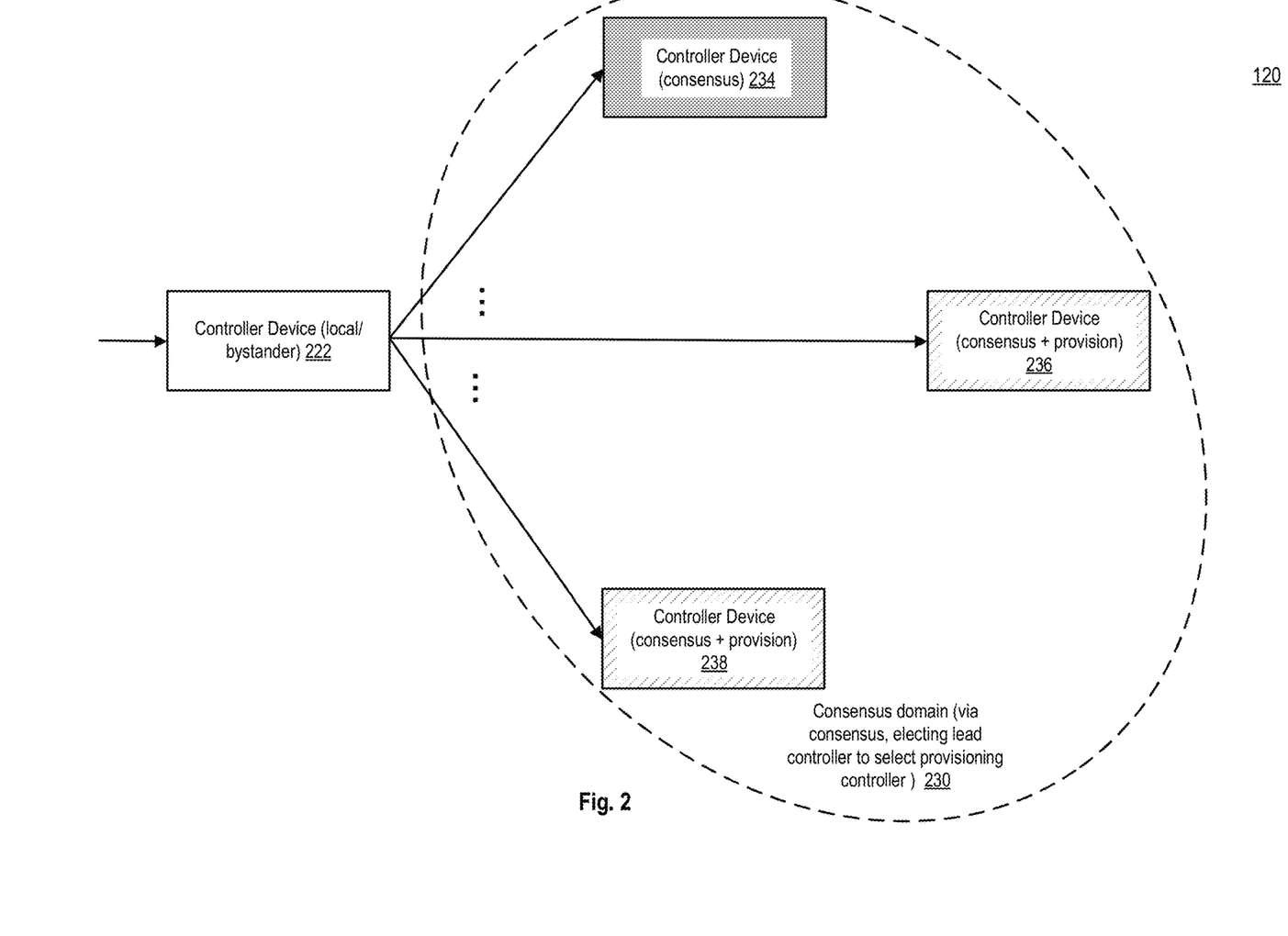
FIG. 2 shows a consensus building process to serve client requests per some embodiments.

FIG. 2 shows a consensus building process to serve client requests per some embodiments. The consensus building process involves multiple controller devices 222 and 234 to 238, all of which are part of the consensus-based control plane 120 in some embodiments. A client request from a network device is received at a controller device 222. The client request may be for obtaining a network service or using an application to serve a client coupled to the network device.

The controller device 222 is thus the local controller device for this client request. As the local controller device, the controller device 222 completes local sanity check on the request and transmits (transmitting is also referred to as broadcasting/relaying/streaming/gossiping) the client request to the other controller devices in the consensus domain as a transaction if the client request passes the sanity check, otherwise the controller device 222 rejects the client request (optionally provides response to the client request for the rejection). The local controller device may include (and/or communicate with) a local server (e.g., a web server or a remote procedural call (RPC) server) to receive the client request and perform the sanity check. The sanity check determines whether it is feasible to serve the client request, based on whether the client request complies with semantic/syntactic requirement, available resources of the local controller device, and/or what is locally known about the available resources in the network.

The received client request may be encrypted, in one embodiment. The local controller device authenticates the client request through an authentication protocol. In one embodiment, the authentication protocol exchanged cryptographic keys. In one embodiment, the local controller device does not maintain the private key or other credential information from the network device once the corresponding client request is confirmed through the sanity check. By not maintaining confidential data from the client request in the consensus-based control plane 120, these embodiments improve network security to serve client requests in the consensus-based control plane 120.

Alternatively, the controller device 222 may be a bystander controller for the client request. The bystander controller does not participate in building a consensus to serve the client request; instead, it accepts the client request, either from the transmission by the local controller device or another controller that has received the transmission and that relays and then transmits the client request further to other controllers.

The client request is received by controller devices within a consensus domain 230 for the client request. A controller device may be invited, or request and then be accepted, to the consensus domain 230. The controller devices within the consensus domain 230 may be qualified based on many factors, such as resource availability (e.g., selecting controllers having enough resources to building a consensus to serve the client request), network conditions (e.g., selecting controllers with bandwidth), characteristics of the client and/or the client request (e.g., the client having a specific privilege level for which certain controllers are required to serve, or the client request having a priority level for which a certain number of controllers are preferred), and preference/requirements of a network operator (e.g., selecting controllers to meet a certain quality of service to serve a client request per requests by the network operator). A number of methods/algorithms may be used to select the controller devices into the consensus domain 230. The selection of controller devices to the consensus domain 230 is dynamic and can change, and different controller devices may be selected to the consensus domains 230 to serving a client request at different stages/iterations of the consensus building process.

Via consensus, the controller devices within the consensus domain 230 elect a single lead controller that selects one or more provisioning controllers to provision resources to serve a client request. In one embodiment, the consensus building process has different stages. Some stages may have several iterations, and in each iteration, different controllers may be selected to participate based on various factors (examples provided above). Additionally, each controller device may play one or more roles.

As shown, controller device 234 is part of the consensus (thus a consensus controller), while controller devices 236 and 238 serve roles (1) forming a consensus, and additionally (2) provisioning resources to serve the client request (thus they are both consensus controllers and provisioning controllers).

A consensus controller device may be elected as a lead controller by the participating controller devices of the consensus. In one embodiment, all consensus control devices serve as voter controllers to elect the lead controller. The consensus may be formed synchronously, where communications between the consensus controllers proceed in rounds. In one round, a process may send all the messages it requires, while receiving all messages from other processes. In this manner, no message from one round may influence any messages sent within the same round. Alternatively, the consensus may be formed asynchronously, where an asynchronous consensus enables a system of multiple asynchronous processes, some of which are faulty, to reach an agreement.

In one embodiment, the consensus is formed based on a distributed consensus algorithm. In some embodiments, the consensus may be formed using methods such as the Paxous consensus algorithm, Practical Byzantine Fault Tolerance (PBFT) algorithm, Phase King algorithm, and Lockstep protocol. In some embodiments, the consensus forming method uses blockchain (e.g., using the blockchain consensus or recording algorithms underlying cryptocurrency such as Ethereum and bitcoin) and/or smart contract, and the controller devices participating a consensus may be referred to as in the same channel to build the consensus. When blockchain is used for consensus forming, either proof-of-stake or proof-of-work may be used. Note that embodiments of the invention may use these and other consensus forming methods (or various blockchain techniques) and are not limited to any particular consensus forming method.

A controller device (such as controller devices 236 and 238) may also play the role of a provisioning controller. A provisioning controller serves a client request by provisioning one or more resources. The provisioned resources may be cloud resources such as storage space, virtual machines (VMs)/servers, network resources such as application/services (e.g., application 188), network ports, routing tables, link bandwidth, and/or other resources to serve the client request.

Figure 3:
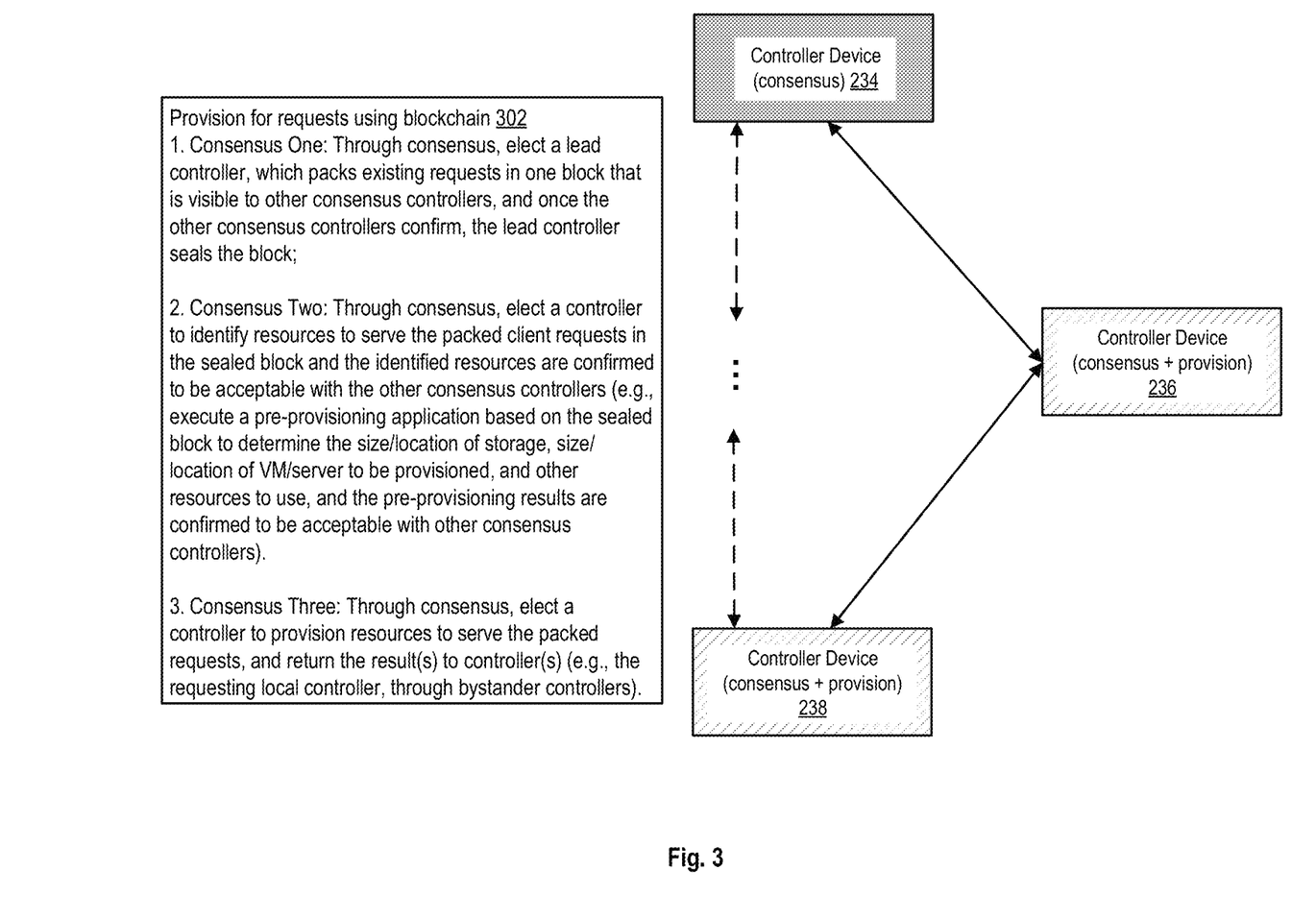
FIG. 3 shows stages of a consensus building process to serve client requests per some embodiments.

FIG. 3 shows stages of a consensus building process to serve client requests per some embodiments. The figure shows three controller devices 234 to 238 within the consensus domain 230 of FIG. 2, and the dotted lines and ellipses between the dotted lines indicate that other controller devices may participate in the consensus building process to serve the client requests.

As shown in box 302, in one embodiment, the process of provisioning for client requests uses blockchain and includes three stages of consensus in some embodiments. At Consensus One, a lead controller is elected through consensus, and the lead controller packs existing requests in one block that is visible to other consensus controllers, which play the role of voter controllers. Once the other consensus controllers confirm the block, the lead controller seals the block.

The block is a record within a list of records. The list of records is a collection of records of outstanding client requests received from bystander/local controller devices. The block is visible to all consensus controllers participating in Consensus One, and the consensus controllers may verify the requests within the block. The verification includes authenticating the requests (e.g., confirm the requests are not altered/garbled during the transmission within the consensus-based control plane 120, that it is from a valid client, and that the system is capable of serving the request).

With the consensus of the voter controllers, the lead controller seals the block. In one embodiment, the sealed block is a blockchain record block that is linked together using cryptography. Each blockchain record block contains a cryptographic hash of the previous block, a timestamp, and transaction data. The timestamp proves that the transaction data existed when the blockchain record block was published to get into its hash. Each blockchain record block contains information about the blockchain record block previous to it, and in aggregation the blockchain record blocks form a chain, with each additional blockchain record block reinforcing the ones before it.

Once the block is sealed, the consensus controllers create Consensus Two, for which a lead controller is elected through another consensus. The Consensus Two lead controller is to identify resources to serve the packed client requests in the sealed block. The identification of the resources is confirmed to be acceptable with other consensus controllers in Consensus Two.

In some embodiments, the identification of the resources includes executing a resource scheduling application (also referred to as pre-provisioning application) to pre-provision resources based on the sealed block, where the resource scheduling application determines the resources to be used. In one embodiment, the resource scheduling application is a SDN orchestration application. The resources may be the cloud resources, network resources, and/or other resources to serve client requests. The pre-provisioning determines the identify and scope of the resources to be used to serve the packed client requests, for example, the size/location of storage, the size/location of VM/server, the network ports to be provisioned to serve packed client requests. The pre-provisioned resources may be distributed across the communication network on multiple controller devices, applications, and/or network devices. In one embodiment, the results of the pre-provisioning are confirmed to be acceptable by the other consensus controllers in Consensus Two. In some embodiments, a public key is used to authenticate the resource scheduling application prior to it identifying the one or more resources to serve the packed client requests.

Once the resources are identified in Consensus Two, the consensus controllers form Consensus Three. In Consensus Three a lead controller is elected through the third consensus, and the lead controller is to select a provisioning controller to provision the identified resources to serve the packed client requests in the sealed block. The provisioning controller may be the lead controller or a voter controller, or it can be another controller outside of the consensus domain.

The selection of the provisioning controller is confirmed to be acceptable by the other consensus controllers in Consensus Three.

In some embodiments, the provisioning controller is selected based on smart contracts in the sealed block, where the smart contracts may be performed by cryptographic hash functions such as secure hash algorithms (SHAs) (e.g., SHA-2, SHA-224, SHA-256, SHA-384, SHA-512, SHA-512/224, or SHA-512/256) and some rules such as choosing resources from certain locations/region or based on certain service level agreements (SLAs). For example, the rules may be to choose resources from data centers in Europe, or a server within 100 miles from the local controller sending the client request; or the rules may be to choose resources from a data center that meets an SLA required for the client request. A smart contract is a computer program or a transaction protocol which is intended to automatically execute, control or document legally relevant events and actions according to the terms of a contract or an agreement. Using smart contracts from the sealed block to select the provisioning controller(s) may allow the provisioning to be load-balanced among multiple provisioning controllers so a single provisioning controller does not need to take on too much workload. In some embodiments, the provisioning controller is selected based on round robin or existing workloads of available controllers (inside or outside of the consensus domain).

The provisioning controller then provisions the resources identified in Consensus Two and returns the provisioning result(s) to one or more controllers. In some embodiments, the provisioning result(s) are returned to the controllers local to the packed client requests, or one or more bystander controllers to transmit the provisioning result(s) to other controllers that are affected by the provisioning.

Note that each of the consensus processing of Consensus One to Consensus Three is a stage in serving the client requests. Each stage may include several iterations of leader selection, in one embodiment. In one embodiment, a timer may be set for each consensus, and if a consensus is not formed during the allocated time period, or the consensus actions are not completed, a new iteration starts, forming a new consensus for the stage. The allocated time period for each stage may differ and the allocated time period may be configurable during run time or predetermined.

The consensus controllers selected for the new iteration may differ from the previous iteration as the resource availability, network conditions, characteristics of the clients and/or the client packed requests, preference/requirements of a network operator, or other factors may be changed. The dynamic selection of the consensus controllers to form consensus in different stages provides the flexibility to adapt and provide better performance to serve client requests.

While this example discusses three stages of consensus building, more or fewer stages may be implemented to serve the client request. For example, in some embodiments, Consensus Two and Three may be integrated as one consensus so the resources are identified and then provisioned within the same stage.

With consensus building among multiple controllers, the multi-stage consensus processing provides security, continuous operations, and performance consistency in serving client requests. The formation of the block using blockchain and serving the block provides better security and transparency of the process. In embodiments of the invention, no single controller handles the full lifecycle of a client request, and a single lead controller coordinating with other voter controllers in each stage offers better consistency in performance than the prior distributed approach. Since no fixed lead controller is used, embodiments overcome the single point of failure issues of the prior centralized approach.

Figure 4:
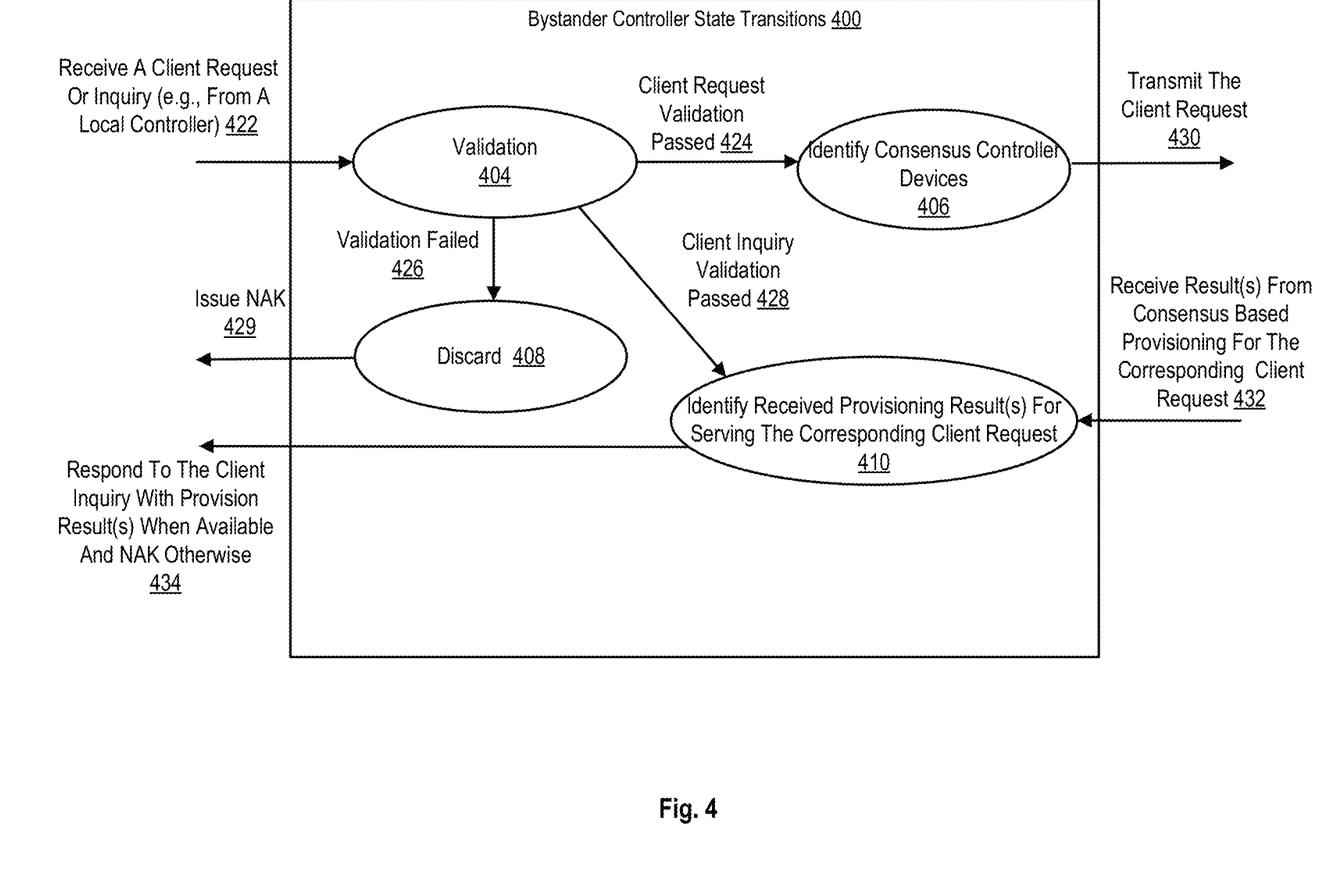
FIG. 4 shows state transitions of a bystander controller per some embodiments.

FIG. 4 shows state transitions of a bystander controller per some embodiments. At reference 422, the bystander controller receives a client request or inquiry. A client request is initiated to provision a service/application for a client, and a client inquiry is a client asking for the current status of an outstanding client request that has not been served. The client request or inquiry may be from a controller local to the client, or it may from another bystander controller.

At reference 404, the bystander controller validates the client request or inquiry, e.g., by running sanity check on the client request or inquiry. If the client request or inquiry fails the validation at reference 426, the client request or inquiry is discarded at reference 408. The bystander controller may return a non-acknowledgement (NAK) at reference 429 to indicate the failure.

If the client request passes validation at reference 424, the bystander controller identifies consensus controller devices at reference 406 and transmits the client request to the consensus controller devices at reference 430. In one embodiment, the client request is transmitted to all of the controller devices in the first consensus.

If the client inquiry passes validation at reference 428, the bystander controller identifies received provisioning result(s) at reference 432, when available, in response to the outstanding client request. The provisioning result(s) are received from the consensus-based provisioning, as described above, in one embodiment, at reference 432. When the provisioning result(s) are available and identified, they are used to respond to the client inquiry at reference 434. If the provisioning result(s) are not available, the bystander controller in one embodiment provides a non-acknowledgement, indicating that the original client request remains unfilled, at reference 434. Note that in some embodiments, the provisioning result(s) or NAK may be shared with the client without the client transmitting an inquiry (e.g., as an event notification or update). In one embodiment, the NAK response may indicate that the provisioning is still in process, and a subsequent affirmative response is sent when the provisioning is completed.

Figure 5A:
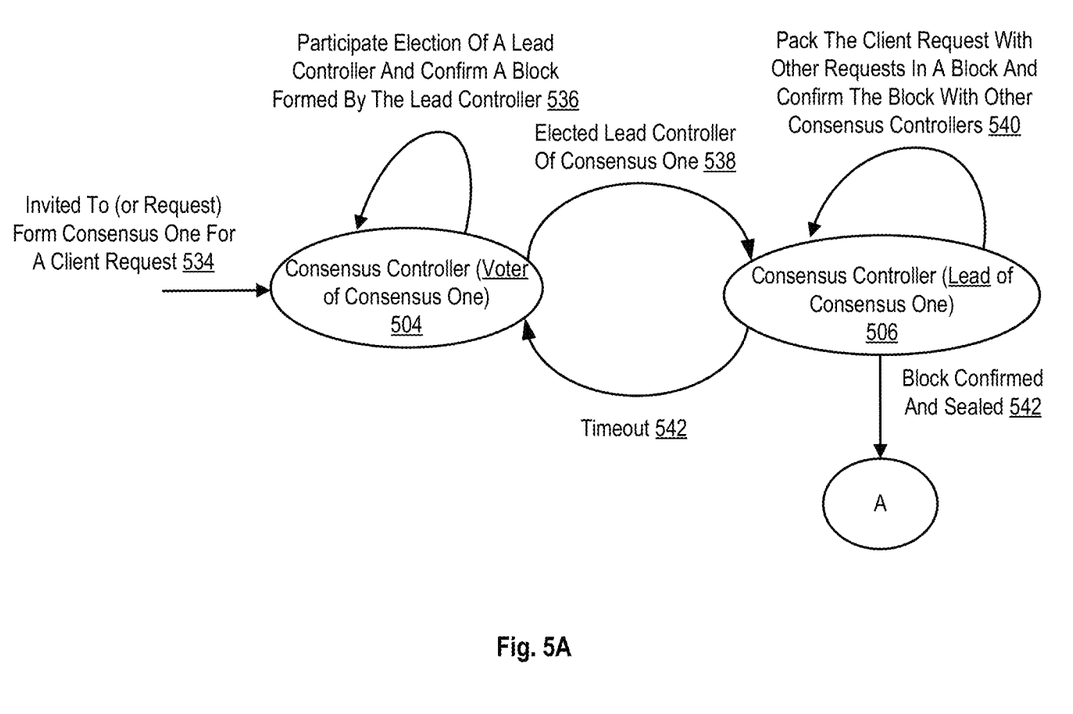
FIGS. 5A-C show a state machine of a consensus controller transition between different roles per some embodiments.
Figure 5B:
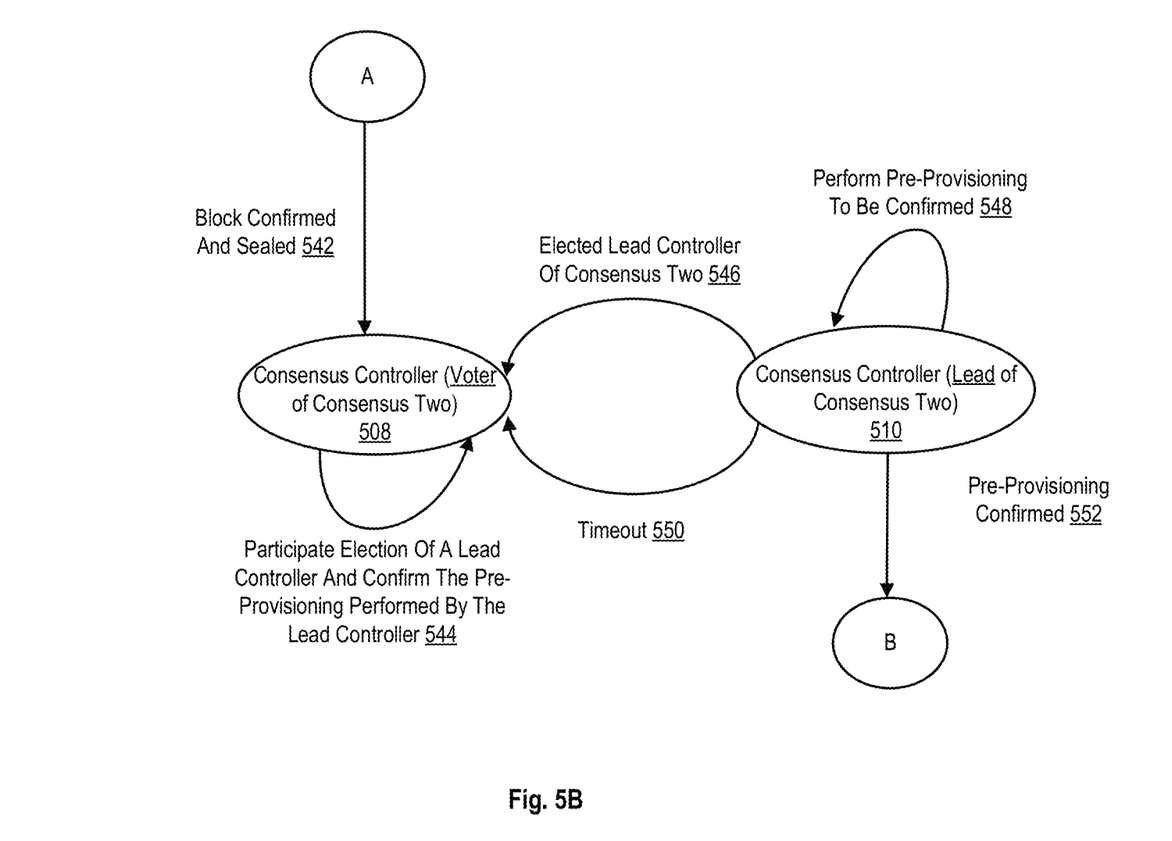
Figure 5C:
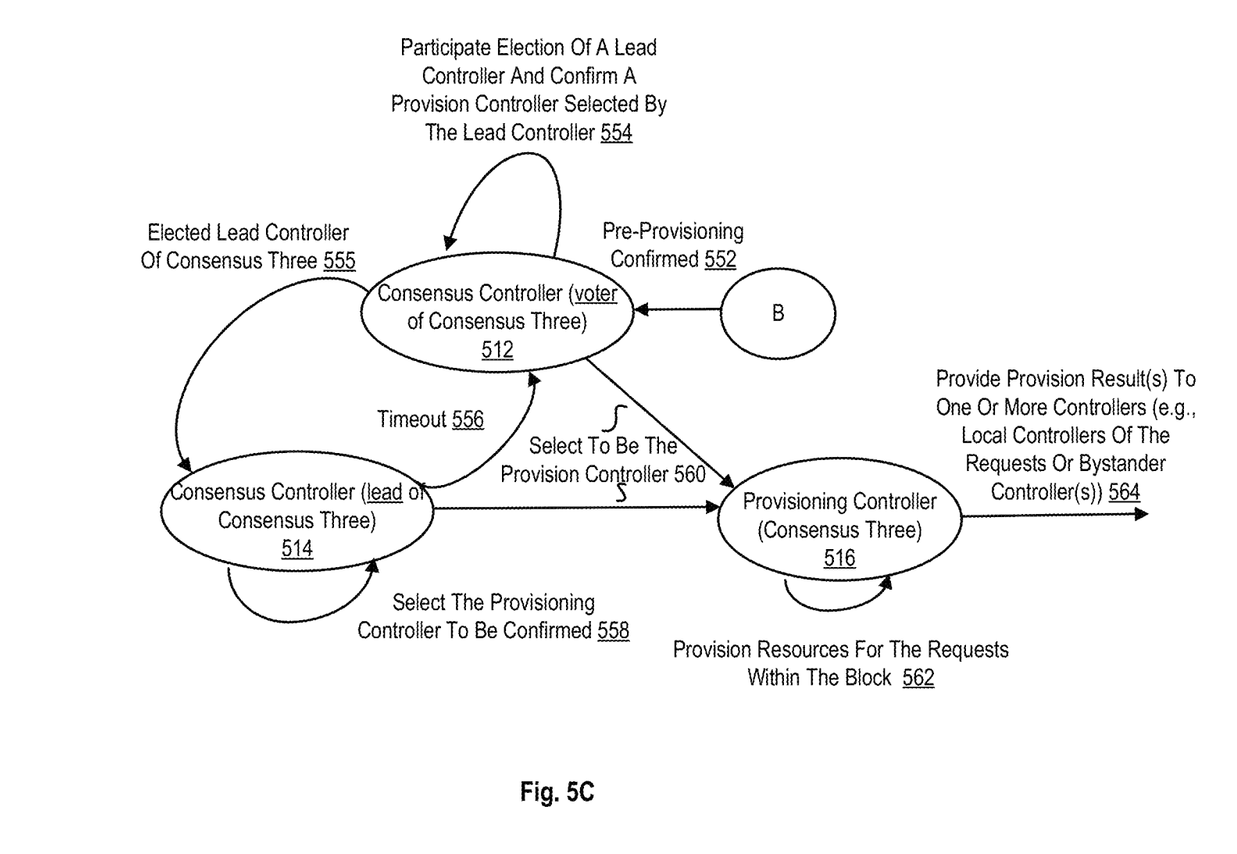

FIGS. 5A-C show a state machine of a consensus controller transition between different roles per some embodiments. FIG. 5A shows the state machine of a consensus controller at Consensus One per some embodiments.

At reference 534, the consensus controller is invited (or the consensus controller may request and be accepted) to form Consensus One for a client request. The selection of a consensus controller to form a consensus is based on the factors discussed above.

The consensus controller serves as a voter controller of Consensus One at reference 504. As a voter controller, the consensus controller participates in election of the lead controller of Consensus One; additionally, once the lead controller is elected and the consensus controller is not the lead controller, the consensus controller confirms the block formed by the lead controller in consensus with the other consensus controllers at reference 536.

The consensus controller may be elected to be the lead controller of Consensus One at reference 538. As the lead controller at reference 506, the consensus controller packs the client request with other requests in a block and confirms the block with other consensus controllers at reference 540. Once the block is confirmed, it is sealed at reference 542, and the flow goes to FIG. 5B at reference A. If the block is not confirmed within an allocated time period, the consensus forming process times out at reference 542, and a new iteration of Consensus One starts at reference 504.

FIG. 5B shows the state machine of a consensus controller at Consensus Two per some embodiments. The state machine starts at Reference A from FIG. 5A. Once the block is confirmed and sealed at reference 542, the consensus controller serves as a voter controller of Consensus Two at reference 508. As a voter controller, the consensus controller participates in election of the lead controller of Consensus Two. Additionally, once the lead controller is elected and the consensus controller is not the lead controller, the consensus controller confirms the pre-provisioning performed by the lead controller in consensus with other consensus controllers at reference 544.

The consensus controller may be elected to be the lead controller of Consensus Two at reference 546. As the lead controller at reference 510, the consensus controller performs pre-provisioning and confirms the pre-provisioning with other consensus controllers at reference 548. Once the pre-provisioning is confirmed, the flow goes to FIG. 5C, at Reference B. If the pre-provisioning is not confirmed within an allocated time period, the consensus forming process times out at reference 550, and a new iteration of Consensus Two starts at reference 508.

FIG. 5C shows the state machine of a consensus controller at Consensus Three per some embodiments. The state machine starts at Reference B from FIG. 5B, and once the pre-provisioning is confirmed at reference 552, the consensus controller serves as a voter controller of Consensus Three at reference 512. As a voter controller, the consensus controller participates in election of the lead controller of Consensus Three. Additionally, once the lead controller is elected and the lead controller is not the consensus controller, the consensus controller confirms the provisioning controller selected by the lead controller in consensus with other consensus controllers at reference 554.

The consensus controller may be elected to be the lead controller of Consensus Three at reference 555. As the lead controller at reference 514, the consensus controller selects the provisioning controller(s) and confirms the provisioning controller(s) with other consensus controllers at reference 558. The provisioning controller(s) will provision the resources for the packed requests in the sealed block. If the consensus does not approve the selected provisioning controller(s) within an allocated time period, the consensus forming process times out at reference 556, and a new iteration of Consensus Three starts at reference 512.

Either the lead or voter controller (or another controller) may be selected to be a provisioning controller at reference 560. The consensus controller is selected to be the provisioning controller at reference 516. As the provisioning controller, the consensus controller provisions resources for the requests within the block packed during Consensus Two, at reference 562. Once the provisioning is complete, the consensus controller provides provision result(s) to one or more controllers such as local controllers of the requests or one or more bystander controllers at reference 564. The local controllers can then report the results of the provisioning to their respective requesting clients.

Figure 6:
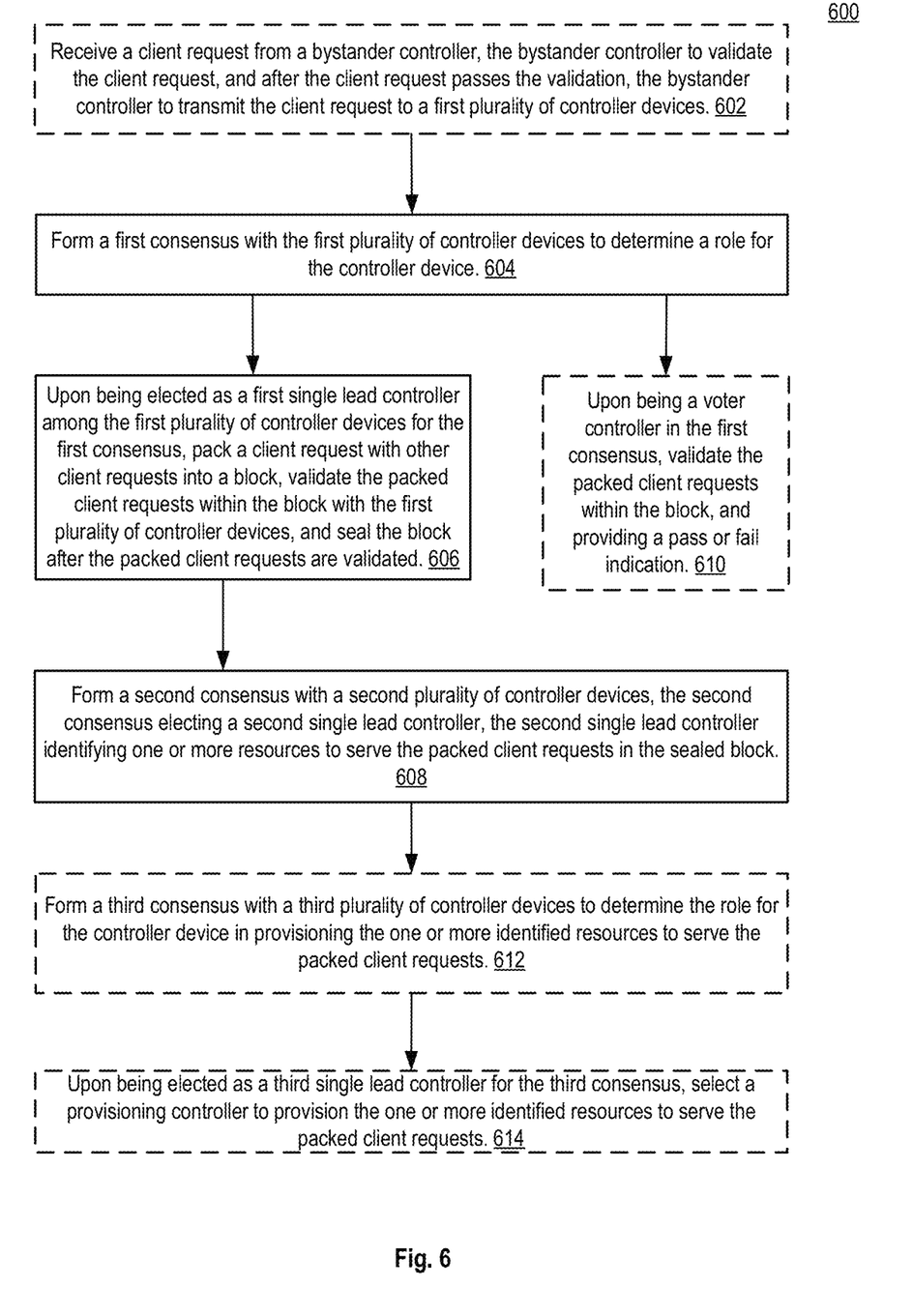
FIG. 6 is a flow diagram showing the operations of a method to coordinate multiple controller devices to serve client requests in a communication network per some embodiments.

FIG. 6 is a flow diagram showing the operations of a method to coordinate multiple controller devices to serve client requests in a communication network per some embodiments. The method 600 may be performed by a controller device such as controller device 126, 234 to 238.

Optionally at reference 602, the controller device receives a client request from a bystander controller. In one embodiment, the bystander controller validates the client request, and after the client request passes the validation, the bystander controller transmits the client request to a plurality of controller devices.

At reference 604, the controller device forms a first consensus with the first plurality of controller devices to determine a role for the controller device. Note that not all controller devices are necessarily part of the first consensus.

At reference 606, upon being elected as a first single lead controller among the first plurality of controller devices for the first consensus, the first consensus lead controller device packs a client request with other client requests into a block, validates the packed client requests within the block with the first plurality of controller devices, and seals the block after the packed client requests are validated. The process of forming the first consensus is discussed in more detail above.

At reference 608, the controller device forms a second consensus with a second plurality of controller devices, the second consensus electing a second single lead controller. The second single lead controller identifying one or more resources to serve the packed client requests in the sealed block. The process of forming the second consensus is discussed in more detail above.

In some embodiments, the bystander controller responds to an inquiry issued by a controller device from which the client request is first received. The response by the bystander controller provides provision results. These provision results are received by the bystander controller after the packed client requests are served by a provisioning controller device.

In some embodiments, upon the packed client requests not being validated within a validation period, the controller device forms a new first consensus to determine the role for the controller device to serve the packed client requests. The new first consensus is a new iteration of the Consensus One.

Optionally at reference 610, upon being a voter controller in the first consensus, the controller device validates the packed client requests within the block and provides a pass or fail indication.

Optionally at reference 612 following operations at reference 608, the controller device forms a third consensus with a third plurality of controller devices to determine the role for the controller device in provisioning the one or more identified resources to serve the packed client requests. At reference 614, upon being elected as a third single lead controller for the third consensus, the controller device selects a provisioning controller to provision the one or more identified resources to serve the packed client requests. The operations of forming the third consensus are discussed in more detail above.

In some embodiments, the provisioning controller is selected based on one or more smart contracts included in the sealed block.

In some embodiments, the provisioning controller provides a result of the provisioning to one or more controller devices upon completion of the provisioning of the one or more resources. These controller devices can then provide the results of the provisioning to their respective requesting client devices.

In some embodiments, the packed client requests are visible to the first plurality of controller devices in the first consensus prior to sealing the block.

In some embodiments, the second single lead controller identifying one or more resources to provision the requests comprises executing a resource scheduling application.

In some embodiments, a public key is used to authenticate the resource scheduling application prior to it identifying the one or more resources to serve the packed client requests.

Figure 7:
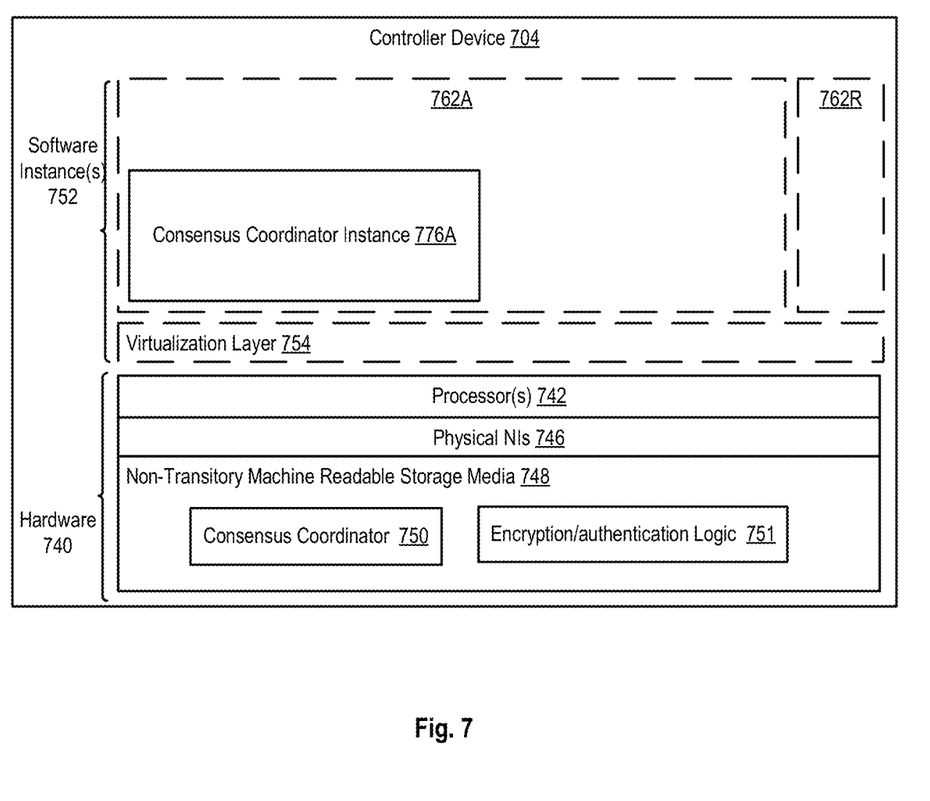
FIG. 7 shows a controller device to coordinate with multiple controller devices to serve client requests per some embodiments.

A controller device herein is an electronic device and FIG. 7 shows a controller device to coordinate with multiple controller devices to serve client requests per some embodiments. The controller device 704 includes hardware 740 comprising a set of one or more processor(s) 742 (which are often COTS processors) and physical network interfaces (NIs) 746, as well as non-transitory machine-readable storage media 748 having stored therein consensus coordinator software 750 and encryption/authentication logic 751. The consensus coordinator software 750 coordinates multiple controller devices to serve client requests in a communication network and when executed by the set of one or more processor(s) 742, may configured to perform operations such as the ones in method 600. The encryption/authentication logic 751 performs encryption and/or authentication that is required in validating client requests/inquires, authenticating resource scheduling application, and performing blockchain related operations.

In embodiments that use computer virtualization, the processor(s) 742 execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications. In another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the consensus coordinator software 750 (illustrated as consensus coordinator instance 776A) is executed (e.g., within the instance 762A) on the virtualization layer 754. In embodiments where compute virtualization is not used, the consensus coordinator instance 776A is executed, as a unikernel or on top of a host operating system, on the "bare metal" controller device 704. The instantiation of the consensus coordinator instance 776A, as well as the virtualization layer 754 and instances 762A-R if implemented, are collectively referred to as software instance(s) 752. Note that the encryption/authentication logic 751 may be instantiated similarly as the consensus coordinator software 750.

References in the specification to "one embodiment," "an embodiment," "an example embodiment," and so forth indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other. A "set," as used herein, refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method executed by a controller device in coordination with a plurality of other controller devices in a communication network, comprising:
    forming a first consensus with a first plurality of controller devices to determine a role for the controller device;
    upon being elected as a first single lead controller among the first plurality of controller devices for the first consensus,
        packing a client request from a client with other client requests from the client or a different client into a block,
        validating the packed client requests within the block with the first plurality of controller devices, wherein the first plurality of controller devices is to confirm that client requests within the block are unaltered and that the client requests within the block are servable by the communication network, and
        sealing the block after the packed client requests are validated; and
    forming a second consensus with a second plurality of controller devices upon sealing of the block, the second consensus electing a second single lead controller, only the second single lead controller within the second plurality of controller devices identifying one or more resources to serve the packed client requests in the sealed block while other controller devices within the second plurality of controller devices are to confirm that identification of the one or more resources is acceptable.

2. The method of claim 1, further comprising:
    prior to forming the first consensus, receiving the client request from a bystander controller, the bystander controller to validate the client request, and after the client request passes the validation, the bystander controller to transmit the client request to the first plurality of controller devices.

3. The method of claim 2, wherein the bystander controller is to respond with a response to an inquiry issued by a controller device from which the client request is first received, the response by the bystander controller providing provision results that the bystander controller receives upon the packed client requests being served by a provisioning controller device that provisions the one or more identified resources to serve the packed client requests.

4. The method of claim 1, further comprising:
    upon being a voter controller in the first consensus, validating the packed client requests within the block, and providing a pass or fail indication.

5. The method of claim 1, further comprising:
    upon the packed client requests not being validated within a validation period, forming a new first consensus to determine the role for the controller device to serve the packed client requests.

6. The method of claim 1, further comprising:
    upon being a voter controller for the second consensus, validating the one or more resources identified by the second single lead controller to be used to serve the packed client requests.

7. The method of claim 1, further comprising:
    forming a third consensus with a third plurality of controller devices to determine the role for the controller device in provisioning the one or more identified resources to serve the packed client requests, and
    upon being elected as a third single lead controller for the third consensus, selecting a provisioning controller to provision the one or more identified resources to serve the packed client requests.

8. The method of claim 7, wherein the provisioning controller is selected based on one or more smart contracts included in the sealed block.

9. The method of claim 7, wherein the provisioning controller is to provide a result of the provisioning to one or more controller devices upon completion of the provisioning of the one or more resources.

10. The method of claim 1, wherein the packed client requests are visible to the first plurality of controller devices in the first consensus prior to sealing the block.

11. The method of claim 1, wherein the second single lead controller identifying the one or more resources to serve the packed client requests comprises executing a resource scheduling application.

12. The method of claim 11, wherein a public key is used to authenticate the resource scheduling application prior to the second single lead controller identifying the one or more resources to serve the packed client requests.

13. A non-transitory machine-readable storage medium coupled to a processor of a controller device in a communication network, wherein the machine-readable storage medium stores instructions, which when executed by the processor, are configured to:
    form a first consensus with a first plurality of controller devices to determine a role for the controller device,
    upon the controller device being elected as a first single lead controller among the first plurality of controller devices for the first consensus,
        pack a client request from a client with other client requests from the client or a different client into a block,
        validate the packed client requests within the block with the first plurality of controller devices, wherein the first plurality of controller devices is to confirm that client requests within the block are unaltered and that the client requests within the block are servable by the communication network, and
        seal the block after the packed client requests are validated, and
    form a second consensus with a second plurality of controller devices upon sealing of the block, the second consensus electing a second single lead controller, only the second single lead controller within the second plurality of controller devices identifying one or more resources to serve the packed client requests in the sealed block while other controller devices within the second plurality of controller devices are to confirm that identification of the one or more resources is acceptable.

14. The non-transitory machine-readable storage medium of claim 13, wherein the machine-readable storage medium stores instructions, which when executed by the processor, are further configured to:
upon being a voter controller in the first consensus, validate the packed client requests within the block, and provide a pass or fail indication.

15. The non-transitory machine-readable storage medium of claim 13, wherein the machine-readable storage medium stores instructions, which when executed by the processor, are further configured to:
upon being a voter controller in the second consensus, validate the one or more resources identified by the second single lead controller to be used to serve the packed client requests.

16. A controller device to be implemented in a communication network including a plurality of controller devices, the controller device comprising a processor and machine-readable storage medium coupled to the processor, wherein the machine-readable storage medium stores instructions, which when executed by the processor, are configured to:
form a first consensus with a first plurality of controller devices to determine a role for the controller device, upon the controller device being elected as a first single lead controller among the first plurality of controller devices for the first consensus,
pack a client request from a client with other client requests from the client or a different client into a block,
validating the packed client requests within the block with the first plurality of controller devices, wherein the first plurality of controller devices is to confirm that client requests within the block are unaltered and that the client requests within the block are servable by the communication network, and
sealing the block after the packed client requests are validated; and
forming a second consensus with a second plurality of controller devices upon sealing of the block, the second consensus electing a second single lead controller, only the second single lead controller within the second plurality of controller devices identifying one or more resources to serve the packed client requests in the sealed block while other controller devices within the second plurality of controller devices are to confirm that identification of the one or more resources is acceptable.

17. The controller device of claim 16, wherein the machine-readable storage medium stores instructions, which when executed by the processor, are further configured to:
form a third consensus with a third plurality of controller devices to determine the role for the controller device in provisioning the one or more identified resources to serve the packed client requests, and
upon being elected as a third single lead controller for the third consensus, select a provisioning controller to provision the one or more identified resources to serve the packed client requests.

18. The controller device of claim 17, wherein the provisioning controller is selected based on one or more smart contracts included in the sealed block.

19. The controller device of claim 17, wherein the provisioning controller is to provide a result of the provisioning to one or more controller devices upon completion of the provisioning of the one or more resources.

20. The controller device of claim 16, wherein the packed client requests are visible to the first plurality of controller devices in the first consensus prior to sealing the block.

* * * * *